United States Patent
Dasch et al.

(10) Patent No.: US 12,473,025 B2
(45) Date of Patent: Nov. 18, 2025

(54) METHOD AND CONTROL APPARATUS FOR OPERATING AN ACTUATOR OF A STEER-BY-WIRE STEERING SYSTEM OF A MOTOR VEHICLE

(71) Applicant: ZF Friedrichshafen AG, Friedrichshafen (DE)

(72) Inventors: Ingo Dasch, Gräfelfing (DE); Dominik Vogt, Meckenbeuren (DE); Luc Diebold, Magstadt (DE); Magnus Rau, Kirchheim unter Teck (DE); Björn Spangemacher, Aidlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 46 days.

(21) Appl. No.: 18/261,375

(22) PCT Filed: Oct. 26, 2021

(86) PCT No.: PCT/EP2021/079592
§ 371 (c)(1),
(2) Date: Jul. 13, 2023

(87) PCT Pub. No.: WO2022/152417
PCT Pub. Date: Jul. 21, 2022

(65) Prior Publication Data
US 2024/0067266 A1    Feb. 29, 2024

(30) Foreign Application Priority Data
Jan. 15, 2021    (DE) .................... 10 2021 200 370.2

(51) Int. Cl.
*B62D 7/15*    (2006.01)

(52) U.S. Cl.
CPC .................................. *B62D 7/159* (2013.01)

(58) Field of Classification Search
CPC ............ B62D 7/159; B62D 6/002; B62D 6/02
See application file for complete search history.

(56) References Cited

U.S. PATENT DOCUMENTS

| 8,417,420 B2 | 4/2013 | Kim |
| 8,983,728 B2 | 3/2015 | Kossira et al. |

FOREIGN PATENT DOCUMENTS

| DE | 199 40 007 A1 | 8/2001 |
| DE | 102 21 721 A1 | 11/2003 |

(Continued)

OTHER PUBLICATIONS

European Patent Office, International Search Report issued in International patent application No. PCT/EP2021/079591 (Jan. 28, 2022).

(Continued)

*Primary Examiner* — Lindsay M Low
*Assistant Examiner* — Charles J Brauch
(74) *Attorney, Agent, or Firm* — Finch & Maloney PLLC

(57) ABSTRACT

A method is provided for operating an actuator of a steer-by-wire steering system of a motor vehicle in a speed range from standstill to parking and/or maneuvering. In one example, the method includes detecting an instantaneous speed of the motor vehicle, determining a limited steering angle as a function of at least the instantaneous speed, detecting a steering angle demand, and activating an actuator for setting a steering angle of at least one wheel, at least as a function of the steering angle demand and having regard to the limited steering angle.

16 Claims, 3 Drawing Sheets

(56) References Cited

FOREIGN PATENT DOCUMENTS

| | | | |
|---|---|---|---|
| DE | 10 2006 018 261 A1 | 10/2007 | |
| DE | 102012206025 A1 * | 10/2012 | ............ B60W 30/06 |
| DE | 10 2012 022 900 A1 | 5/2014 | |
| DE | 10 2013 016 422 A1 | 4/2015 | |
| DE | 10 2014 206 934 A1 | 10/2015 | |
| DE | 102014017127 A1 * | 5/2016 | ............. B62D 5/001 |
| DE | 10 2016 221 563 A1 | 5/2018 | |
| DE | 10 2017 206 701 A1 | 10/2018 | |
| DE | 10 2018 208 934 A1 | 6/2019 | |
| DE | 10 2018 124 244.1 A1 | 4/2020 | |
| EP | 2562064 A2 * | 2/2013 | ........... B62D 7/1509 |

OTHER PUBLICATIONS

European Patent Office, Written Opinion issued in International patent application No. PCT/EP2021/079591 (Jan. 28, 2022).
German Patent Office, Search Report issued in German patent application No. 10 2021 200 369.9 (Jul. 15, 2021).
European Patent Office, International Search Report issued in International patent application No. PCT/EP2021/079592 (Jan. 28, 2022).
European Patent Office, Written Opinion issued in International patent application No. PCT/EP2021/079592 (Jan. 28, 2022).
German Patent Office, Search Report issued in German patent application No. 10 2021 200 370.2 (Jul. 15, 2021).
German Patent Office, Office Action issued in German patent application No. 10 2021 200 370.2 (Sep. 8, 2023).

* cited by examiner

METHOD AND CONTROL APPARATUS FOR OPERATING AN ACTUATOR OF A STEER-BY-WIRE STEERING SYSTEM OF A MOTOR VEHICLE

RELATED APPLICATIONS

This application claims the benefit under 35 U.S.C. § 371 as a U.S. National Phase Application of application no. PCT/EP2021/079592, filed on 26 Oct. 2021, which claims benefit of German Patent Application no. 10 2021 200 370.2 filed 15 Jan. 2021, the contents of which are hereby incorporated by reference in their entireties.

FIELD OF THE DISCLOSURE

The invention relates to a method and a control unit for operating a steer-by-wire steering system of a motor vehicle.

BACKGROUND

From DE 10 2014 208 934 A1 an actuator with a positionally fixed spindle nut and a spindle which can be displaced relative thereto is known. At least one end of such an actuator, which is used in a steer-by-wire steering system, is connected to a wheel carrier by means of a steering link. By virtue of the linear displacement of the spindle the wheel steering angle of a wheel mounted to rotate on the wheel carrier can be changed. The steer-by-wire steering system, which can be actuated at least indirectly by way of a steering handling device such as a steering-wheel or which works independently of any such, is controlled along the signal path, i.e., without any mechanical coupling. During a steering process such a steering system has to overcome a frictional resistance of the wheels relative to the road. Particularly at very low speeds, such as when maneuvering or parking until the vehicle is at a standstill, comparatively large steering forces are needed, and these forces severely stress the actuator. A spindle drive of the actuator can be excited into resonance vibrations by alternating static friction and sliding friction, and the spindle drive can reach high temperatures, which can result in damage to the actuator and hence to the steer-by-wire steering system.

SUMMARY

Against that background a purpose of the present invention is to indicate an improved method and an improved control unit for controlling an actuator of a steer-by-wire steering system of a motor vehicle, when the vehicle is moving at very low speed while parking or maneuvering.

According to a first aspect of the invention, a method is indicated for operating an actuator of a steer-by-wire steering system of a motor vehicle which is steered while at rest or moving at a very low speed compared with normal driving, the said method having the following steps:
  Detection of an instantaneous speed of the motor vehicle
  Determination of a limiting steering angle as a function of at least the instantaneous speed
  Detection of a steering angle demand
  Activation of the actuator to set a steering angle of at least one wheel, at least as a function of the steering angle demand and having regard to the limited steering angle.

An actuator of a steer-by-wire steering system of a motor vehicle preferably comprises a housing, in which a spindle and a rotatable but positionally fixed spindle nut are accommodated. The spindle and the spindle nut form a movement thread and within the housing constitute part of a spindle drive mechanism for the axial displacement of the spindle relative to the spindle nut, and thus also relative to the housing. For that purpose, the spindle has an outer thread which engages with the inner thread of the spindle nut. When the spindle nut is driven in rotation, for example by an electric motor and preferably indirectly by a transmission system, preferably a belt transmission, then the effect of the movement thread is that the spindle is displaced axially along its longitudinal axis relative to the spindle nut and the housing. By virtue of the said axial movement along its longitudinal axis the wheel steering angle of a wheel arranged to rotate on a wheel carrier can be changed, the said wheel carrier being connected at least indirectly to an end of the spindle.

The large adjustment forces required during steering result in severe friction in the transmission system of the actuator, particularly in the movement thread of a spindle drive of the actuator. Even when optimized lubricants are used, severe friction occurs between the flanks of the thread inside the movement thread, i.e., between the spindle and the spindle nut. Owing to the static and sliding friction between the thread partners that takes place on the contact surfaces of the thread flanks in contact with one another, a so-termed stick-slip effect can occur. This is the alternating sticking and sliding of the thread flanks, which can result in fluctuating torques between the spindle nut and the spindle itself. Thereby, the spindle can for example be excited into vibrations, in particular rotary vibrations. A continuous or temporary excitation lasting for a minimum time can result in generating a resonance frequency of the spindle or other components in the actuator. Furthermore, the vibrations result in thermal loading, which can affect the lubricating properties of the lubricant adversely. This can have a negative effect on the life of the actuator.

The aforesaid rotary vibration is also known as torsional vibration. In contrast to translational vibrations, rotary vibrations oscillations take place about the rotational degree of freedom of a system, in this case about the longitudinal axis of the spindle. In both cases these are mechanical oscillations.

The term 'stick-slip effect' derives from the two English words "stick" (adhere) and "slip" (slide). In physical and technological contexts, the stick-slip effect describes a generally undesired jerky sliding movement (standstill-slide-standstill-slide . . . ) of solid bodies moving relative to one another.

A steer-by-wire steering system is a steering device decoupled from the mechanical connection to a steering handling device such as a steering-wheel. The steering movement by the driver by means of a steering handling device is not transmitted to the wheel carriers or wheels along any mechanical path such as a linkage. Rather, a steering angle or its change are calculated for the wheels of an axle concerned, for example in a control unit, which sends control signals to the actuator or actuators of the steer-by-wire steering system and ultimately brings about the steering angle change or adjustment of the steering angle at the wheel concerned. In this, the steering angle demand by the driver or a steering angle change calculated by a control unit can differ from the maximum steering angle that can be set at the axle concerned, for example it may be larger. In such a case, at most the maximum steering angle can be set.

The steering angle demand consists of a request for a change of the steering angle from the existing steering angle to an intended steering angle, wherein the steering angle demand is also dependent on time. In other words, the steering angle is changed within a certain time span, which is known as the steering rate or also the steering gradient. As an example, let it be said here that in order to change the steering angle for example by 5° a driver may turn the steering-wheel slowly, for example at 2°/s, or very quickly, for example at 20°/s. In other words, for one thing the change of angle but also the rate of the angle change is detected with the steering angle demand.

During normal operation of a steering device, for the most part small wheel steering angle changes are made when a vehicle is moving at a speed substantially higher than the above-mentioned range of speed from standstill up to parking and/or maneuvering, for example when driving in a closed urban area, such as 30 to 50 km/h or at an even higher speed on a main road or motorway. There, as a rule steering angle changes of less than 1° are involved. For these small changes, therefore, comparatively much smaller adjustment forces are needed so rotary vibrations do not occur.

The approach presented here is based on the recognition that in some situations a higher torque or a larger force is needed for steering a respective wheel, or in other words forcing it into a desired steering angle or wheel steering angle. The situation considered here starts from when the vehicle is at rest to when it is moving at a very low speed, as when parking and/or maneuvering. When fully at rest the speed is equal to 0 km/h. During parking and/or maneuvering a speed equal to or lower than 1 km/h can be assumed. In a speed range from 0 to about 1 km/h the forces required for producing the desired steering angle are particularly large. The lower the speed, the larger are the steering forces for this that have to be exerted by the actuator of the steer-by-wire steering system. This is because the total gravitational force of the vehicle is supported by the tires fitted on its wheels. The contact between the tires and the road is determined by the tire contact area. The size of the contact area of a tire depends mainly on the wheel loading and the tire pressure, because the internal pressure of the tire bears most of the wheel load. However, tire width, tire diameter and the rigidity of the sidewalls also play a part. When a wheel is at rest the force required for steering it, i.e., rotating it about its vertical axis, is larger than when it is rolling, because the vehicle is moving. As the rolling movement increases, less and less force is needed for steering. It can be understood that beside the mass of the vehicle, the temperature of the environment and the tire temperature also have an influence since they directly affect the friction between the tires and the road surface. Not exclusively, the following additional parameters may also be mentioned: tire composition, type of tire, friction coefficient of the tire, road surface covering and condition of the road (dry, wet, smooth, etc.).

The tire of a wheel is generally made of rubber—an elastic material. If now a force for steering the wheel, applied by the actuator of a steer-by-wire steering system, acts upon the wheel, then a prestress is produced due to the static friction or sliding friction between the tire and the road surface. The tire is, as it were, raised relative to the road and thus prestressed. Further prestress is produced between the actuator and the wheel carrier by bearings between them and sometimes also links, such as a steering linkage, depending on the design of the chassis.

If now, in the aforesaid low-speed range, the wheel is steered back starting from a large, preferably maximum possible steering angle to a smaller steering angle, then the prestresses are first reduced for a short time and new prestresses are produced. This prestress increases the lower is the speed of the vehicle or when it changes from rolling to a standstill. During parking and/or maneuvering this is the case, almost in constant alternation. When steering back from the previously set large steering angle a force direction change takes place in the actuator of the steer-by-wire steering system. This results in a load change within a transmission or spindle drive of the actuator, so that in turn it adopts a different stick-slip behavior. This can result in vibrations and high thermal loads in the actuator and its movement thread. That behavior must be reduced or minimized.

In this context large steering angles are understood to mean steering angles which reach the range of the designed possible maximum steering angle for the axle concerned. Furthermore, during maneuvering or parking the wheel steering angles often change. By using a larger, preferably the largest possible steering angle, it is simpler to drive for example into a parking space or to maneuver with a trailer. Thus, it is particularly advantageous if, in addition to the front axle, the rear axle of the motor vehicle can also be steered.

According to the invention, in the aforesaid method, as a function of the instantaneous speed of the motor vehicle the maximum possible steering angle is restricted to a limited steering angle. This limitation of the steering angle overcomes the problem that when steering in the said low-speed range an excessive prestress is built up. If in the step of detecting a steering angle demand a steering angle is called for which is larger than the limited instantaneous steering angle, then the maximum steering angle that can be set is the limited instantaneous steering angle. In the activation step the actuator of the steer-by-wire steering system can only set a steering angle as a function of the steering angle demand and having regard to the limited steering angle. Thus, any steering angle can be set which is smaller than or equal to the pre-determined limited steering angle. The actuator is preferably activated by a control unit such as a controller or control system. The control system or controller is preferably part of the steer-by-wire steering system. However, the actuator can also be activated by another control unit built into the vehicle.

Advantageously, by virtue of the invention the vibration behavior of the actuator of a steer-by-wire steering system or the components it comprises can be minimized by activating it in accordance with the method, without having to modify an existing actuator.

In a preferred embodiment, in the determination step the limited steering angle can be changed to a value smaller than a predefined maximum steering angle. This consideration takes into account that a predefined maximum steering angle which is possible by virtue of the design of the steer-by-wire steering system in the vehicle concerned, can change due to boundary conditions such as the aforesaid conditions relating to the prestress. For example, the designed maximum possible steering angle may also not be appropriate because a different tire size, for example wider tires or tires with snow chains on the steered axle are being used. Then it might also not be appropriate to set the designed maximum possible steering angle because the vehicle is heavily loaded, since if the wheels are covered too deeply by the wheel arches there is less room for steering movements. Thus, with this embodiment every vehicle situation is taken into account, so that these is less risk of the wheels or tires coming in contact with the chassis or the vehicle body due to a steering angle that is too large.

Preferably, in the determination step the limited steering angle is established on the basis of a characteristic curve. By virtue of the characteristic curve, it can be established that the limited steering angle amounts to 50 to 80%, preferably 70% of the predefined maximum steering angle. For example, if in a steer-by-wire steering system designed as a rear axle steering system the maximum possible steering angle is 10°, then on the basis of the 5° to 8° characteristic the limited steering angle is preferably at most 7°. For various vehicle situations different characteristics can be established. For example, the characteristics can be selected by a unit in a control device in which they are stored. The characteristics are preferably selected as a function of the instantaneous speed of the vehicle, the steering angle demand having regard also to the limited steering angle, and the size or type of tires being used or the loading condition or other conditions. For this, one or more parameters can be decisive.

The method is based essentially on the determination of the steering angle as a function of the instantaneous speed of the motor vehicle. In this a distinction is essentially made between whether the vehicle is moving at a very low speed (speeds from standstill up to parking or maneuvering speeds—see earlier) or at higher speeds. Preferably, in the step of determining the limited steering angle a first steering angle range from 0° to angles smaller than or equal to the limited instantaneous steering angle, and a second steering angle range larger than the instantaneous limited steering angle up to the predefined maximum steering angle, are established and preferably stored in a control system. Then, the steering angle to be set at a speed of the motor vehicle in a first speed range from standstill up to a first speed can adopt any value in the first steering angle range. The said first speed in this case has a value in the range from 0.5 to 1 km/h, preferably around 0.7 km/h and preferably at most exactly 0.7 km/h. In other words, the actuator can set any steering angle within the range between 0° and the limited steering angle when the vehicle is at rest or moving at a speed which can be from 0 km/h (standstill) up to a maximum of the said first speed. This minimizes excessive loading of the actuator.

A steering angle of 0° is also called the central position or the neutral steering angle and corresponds to driving a vehicle straight ahead when a steering angle of 0° is set at each steerable axle. The wheels are then parallel to the longitudinal direction of the vehicle.

Also possible is an embodiment in which after driving at a speed higher than the said first speed, the speed is reduced to the first speed range and remains therein. The vehicle is then moving at the low speed from standstill for example up to 0.7 km/h and, in accordance with the method, a limited steering angle would be determined as a function of the instantaneous speed. Preferably, on slowing down from the higher speed into the first speed range, the most recently set maximum steering angle is established as the new limited steering angle. The reason for this is that owing to the previously existing higher speed no prestress built up when the steering angle was set. If on the grounds of the predefined maximum steering angle a steering angle of 10° was possible and in the first speed range a limited steering angle of 7° was determined, then outside the first speed range a steering angle of 7.5° could be set. If now the speed is reduced into the first speed range, in this embodiment the new limited steering angle is established and kept at 7.5°.

If, in accordance with the above explanation, the steering angle is retained in the first speed range owing to the speed reduction into the first speed range, and owing to a new steering angle demand a steering angle larger than 50 to 80%, preferably 70% of the predefined maximum steering angle is called for, then at most a steering angle larger than 50 to 80% and preferably 70% of the predefined maximum steering angle up to the retained limited steering angle can be set. For example, after slowing into the first speed range with the vehicle at rest and if a steering angle larger then 7° has been called for, only an angle between the retained value such as 7.5° and 7° can be set. In other words, in this embodiment the maximum steering angle that can be set is not larger than the steering angle retained from the previous movement at a higher speed. The reason for this extended limitation is that if the steering angle is increased above the retained value an unfavorable, too large prestress would build up because the motor vehicle is moving in the low-speed range. In the range from 7° to 7.5° no such prestress occurs, as has been surprisingly found.

Preferably, at a speed higher than the aforesaid first speed the limited steering angle is cancelled. In this way it is possible, after the steering angle demand has been detected, to set a steering angle up to the predefined maximum steering angle in the actuator activation step. Above the first speed, the speed of the motor vehicle or the wheel rotation speed is so high that in the tires relative to the road and also in bearings or control arms such as the steering linkages, no prestress or at least none that is harmful builds up.

If the vehicle is moving at a low speed, i.e., one within the first speed range, then it is preferable for the steering rate, which is expressed by a steering gradient, also to be adapted, preferably reduced. The steering rate is taken into account, for example, as a parameter in degrees per second. In the first speed range from standstill to at most 1 km/h and preferably 0.7 km/h, the steering rate can for example be in a range from 0° to 12°/s. Above the first speed the steering gradient can increase in a constructively permissible manner, for example also to a range from 12° to 18°/s. The steering gradient is adapted as a function of the demand, so that a steering angle change can take place in accordance with the time requirement.

When the first speed range in which the limited steering angle is cancelled is exited, and when the speed is increased, for example by a sudden rapid acceleration of the vehicle, to ensure that no abrupt steering movement takes place, as the speed increases a hard switch from the limited steering angle to the maximum steering angle is avoided. Preferably, as a function of the instantaneous speed and/or the acceleration and also the steering angle demand, a gradual adaptation of the limited steering angle, for example 7°, to the maximum steering angle of 10° is carried out. The aforesaid boundary conditions, for example, in relation to the loading of the vehicle, are preferably taken into account in this. To avoid an abrupt steering angle change, for that purpose the steering gradient is adapted to a value that the driver of the vehicle can cope with, and in this various driving modes such as ecological driving or sporty driving can be taken into account. Preferably the adaptation takes place in accordance with at least one characteristic curve. The steering gradient can depend on the speed of the vehicle, for example 4°/s at 0 km/h (vehicle at rest), 2°/s at 10 km/h and 0.25°/s at 250 km/h. The said at least one characteristic thus affects the adjustment rate of the actuator and this possible steering angle change is adapted smoothly, so that no abrupt steering angle change takes place but rather, as imperceptible a transition as possible. This is advantageous from the standpoints of both driving safety and comfort.

In a further preferred embodiment, as a function of the instantaneous speed from a standstill up to parking and/or maneuvering, in the step of determining the limited steering angle an acceleration of a drive unit of the actuator is changed, preferably reduced. The change takes place at least temporarily, and the acceleration is preferably reduced. In that way the aforesaid loads on the actuator that can occur at large steering angles can be reduced. Thus, at moderate and smaller steering angles a higher or even the maximum acceleration of the drive mechanism of the actuator of the steer-by-wire steering system is possible. For different steering angle ranges different limited accelerations can be established, preferably with reference to at least one characteristic curve. The limiting of the acceleration has the advantage that the actuator at first starts up more slowly and the loading is therefore low. After the slow start, so far as possible the actuator preferably accelerates to a higher steering gradient, so that in accordance with the steering angle demand the steering angle change takes place over the same time as if the acceleration had not been limited.

The invention also relates to a steer-by-wire steering system with an actuator, which is operated in accordance with the above-mentioned method steps. Particularly advantageous is an embodiment in which, in the activation step, an actuator of a steering system associated with a steerable rear axle of the motor vehicle is activated. If at the rear axle a steering angle is set which is opposite to the steering angle at the front axle, then besides a smaller turning circle of the vehicle maneuvering and parking are also better. Besides the steerable rear axle, the front axle can also be made with a steer-by-wire steering system.

According to a further aspect, the invention relates to a control unit for controlling an actuator of a steer-by-wire steering system of a motor vehicle, wherein the control unit embodies the following features:

- an interface for detecting a speed that represents an instantaneous speed of the motor vehicle,
- a further interface for detecting a steering angle demand, that represents an instantaneously called for steering angle change due to a driver's wish or a further change of a steering angle determined by a control unit,
- a unit for determining a limited steering angle, which represents an instantaneous maximum possible steering angle as a function of at least the instantaneous speed,
- a unit for activating the actuator in order to set a steering angle of at least one wheel, as a function of at least the steering angle demand and having regard to the limited steering angle.

In this case the control unit can also authorize the limited steering angle temporarily, i.e., intermittently and for a defined time or for a certain time period. Besides an instantaneous steering angle change due to a driver's wish, i.e., when the driver makes a steering movement for example at a steering-wheel, it is also possible by means of a control unit, for example an electronic stability program (ESP), to implement a steering angle demand.

In this case the control unit can be a controller, which for example can be an electrical unit which processes electric signals, for example sensor signals and which emits control signals as a function thereof. The device can have one or more suitable interfaces, which can be in hardware or software form. In the case of a hardware design the interfaces can for example be part of an integrated circuit in which functions of the device are implemented. The interfaces can also be stand-alone integrated circuits or can at least partially consist of discrete structural elements. In the case of a software design the interfaces can be software modules, which for example are present in a microcontroller in addition to other software modules.

Also advantageous is a computer program product with program codes, which can be stored on a machine-readable support such as a semiconductor memory, a hard drive memory or an optical memory and is used for carrying out the method in accordance with one of the embodiments described earlier when the program is run in a computer or a control unit.

BRIEF DESCRIPTION OF THE DRAWINGS

Below, the invention is described with reference to preferred embodiments and to the drawing, which shows.

DETAILED DESCRIPTION

Figure 1:
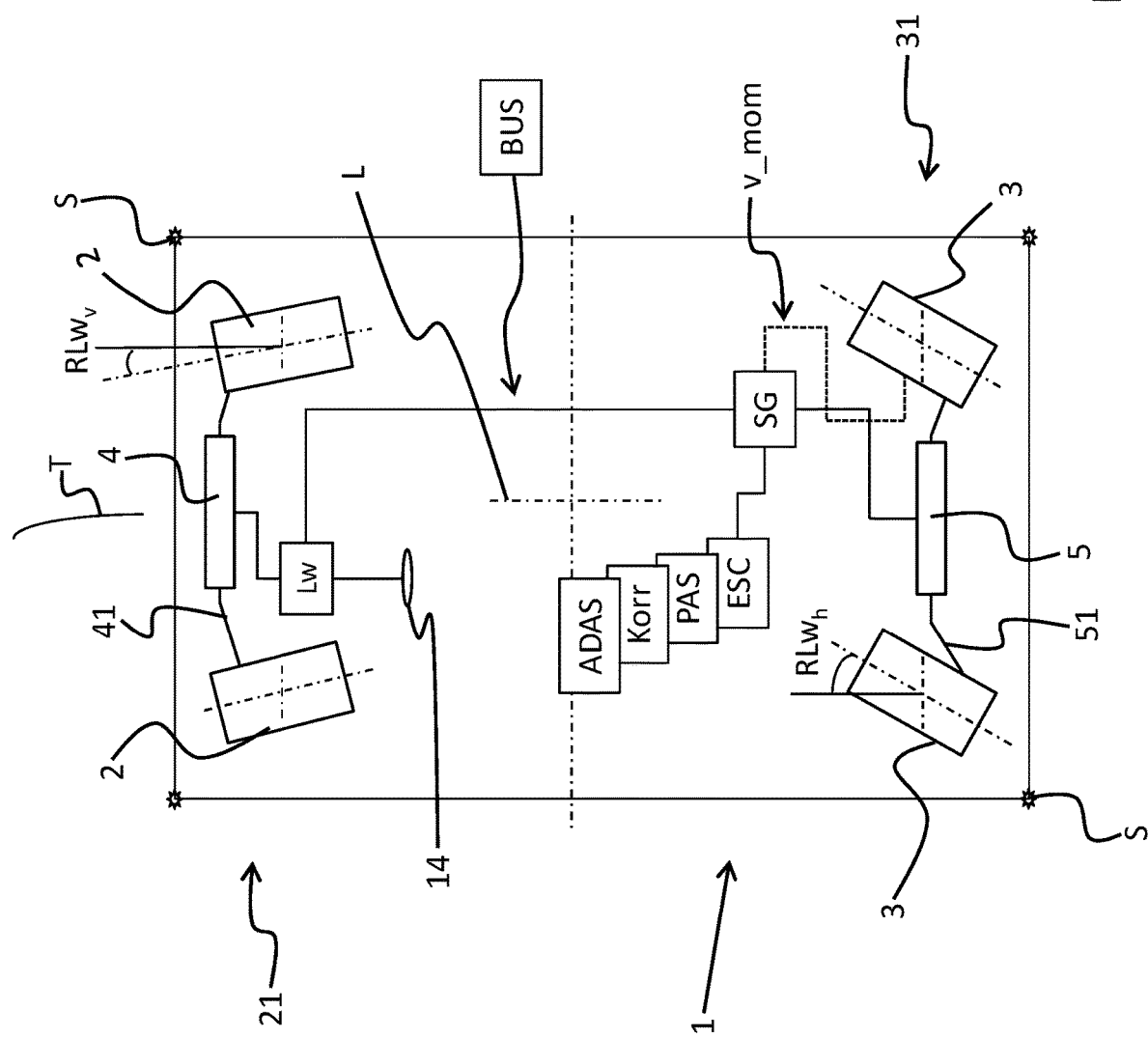
FIG. 1: A vehicle with a steer-by-wire steering system according to the known prior art.

FIG. 1 shows schematically a vehicle 1 with a steerable front axle 21 and a steerable rear axle 31. To steer the wheels 2 on the front axle 21 a steer-by-wire steering system 4 is provided, which by way of a steering linkage 41 can set the wheel steering angle $RLw_v$, at the front axle or change that angle. This angle $RLw_v$, is shown as an example at the front, right-hand wheel 2 of FIG. 1. At the rear axle 31, by way of a steering linkage 51 a steer-by-wire steering system 5 sets or changes the wheel steering angle $RLw_h$ of the rear wheels 3, as indicated for the rear wheel 3 on the left. As part of the steer-by-wire steering system in each case an actuator (not shown) is provided, which can apply a force in order move a steering rod or spindle linearly, which rod or spindle collaborates by way of the steering linkages 41, 51 with the wheels 2, 3 in order to steer them. In the embodiment shown, the wheels on the front axle 21 and the rear axle 31 are steered in opposite directions, so that at a low speed for example of less than 5 km/h the turning circle is advantageously reduced and the maneuvering and parking ability is improved compared with vehicles that have only one steerable axle. Furthermore, with two steered axles automated journeys can be carried out advantageously since the vehicle can be maneuvered in a smaller space. The steering angle is set at the front axle 21 essentially by means of a steering-wheel 14, whereby the steering angle desired by the driver is detected via a sensor unit Lw by a control unit SG and sent by way of a signal line to the steer-by-wire steering system 4. From the steering angle demand Lw_req indicated by the driver, the control unit calculates the steering angles $RLw_v$, $RLw_h$ for the front and rear axles as a function of the driving situation (loading, vehicle speed, vehicle acceleration, yaw rate $R_G$, etc.) and emits control signals to the steer-by-wire steering systems 4, 5, which then set the corresponding steering angles at the axles 21, 31.

The control unit SG is connected by here schematically depicted signal lines to the steer-by-wire steering systems 4, 5, which set the steering angles $RLw_v$, $RLw_h$. The sensor units (not shown) for determining the respective steering angles $RLw_v$, $RLw_h$ of the wheels 2, 3 are electrically connected by a BUS system to the control unit SG and to the steer-by-wire steering systems 4. 5. The bus system is for example a CAN bus or even a Flexray bus or similar bus system, which is used in vehicles for data and signal transmission. By way of the bus system, steering functions for a driver assistance system such as ADAS autonomous driving, Korr corridor functions for limiting a maximum steering angle as a function of the driving situation, a PAS parking assistance system for assisted or automated parking, or even an ESC electronic stability control system, etc., are transmitted electrically between the control unit SG and the steer-by-wire steering systems 4, 5 of the front axle 21 and the rear axle 31. The control unit SG is represented schematically, and as a central unit emits control signals to the steer-by-wire steering systems 4, 5, which carry out the steering angle changes and set the steering angles $RLw_v$, $RLw_h$.

At the ends of the vehicle 1 sensors S are arranged, which are associated with a sensor system and serve to recognize the environment of the vehicle. These can be temperature sensors or optical sensors, for example including a camera, or even LiDAR or radar sensors, which are suitable for detecting temperature, distances or even for optical observation for example of the road. Thus, environmental conditions such as humidity or the road condition and also their temperature, etc., can be detected and transmitted to the control unit SG. The vehicle follows a trajectory T, which in FIG. 1 is represented schematically at the front end of the vehicle in its travel direction.

In order to turn the wheels 2, 3 of the vehicle 1 by means of the respective steer-by-wire steering systems 4, 5 about their vertical axis for steering purposes, the friction of the tires of the wheels 2, 3 against the road has to be overcome. The lower the speed of the vehicle, the less do the wheels 2, 3 move or roll on the road in the intended travel direction. In the vehicle 1 shown, its gravitational force loads the four wheels 2, 3 represented, or their tires. The contact between tires and road is determined by the tire contact area. By virtue of the tire material, as a rule mostly rubber, and the condition of the road, there is friction between the tires and the road. The lower the speed of the vehicle, the more force is required for steering the wheels 2, 3 since the friction increases as the speed decreases. On this point see also the detailed explanation given earlier.

If now, a wheel 2, 3 is steered on the steerable rear axle from a position (not shown) parallel to the longitudinal axis L of the vehicle to the right through an angle $RLw_h$ as shown, and if during this the speed of the vehicle is in a range from standstill up to around 1 km/h (speed v_0-1), then relative to the road a prestress builds up in the tires. The tire material is elastic and is, as it were, raised relative to the road. Furthermore, prestresses can occur due to elasticity in the steering linkages 41, 51 and the joints (not shown). If now, after a deflection of the wheels 3 on the rear axle 31 to the right the steering is reversed (steered-back) in the opposite direction, then there is a change in the direction of the force on the steer-by-wire steering system 5 on the rear axle 31. During this steering-back, a steering transmission of the actuator of the steer-by-wire steering system 5 experiences a stress relief, at least for a short time, and then again a severe load due to the force needed or to be produced for the back-steering. The larger the steering angle called for and the lower the speed, the higher is the prestress produced. This can result for example in vibrations and thermal loading of the actuator of the steer-by-wire steering system, which can ultimately be damaging for the actuator.

Figure 2:
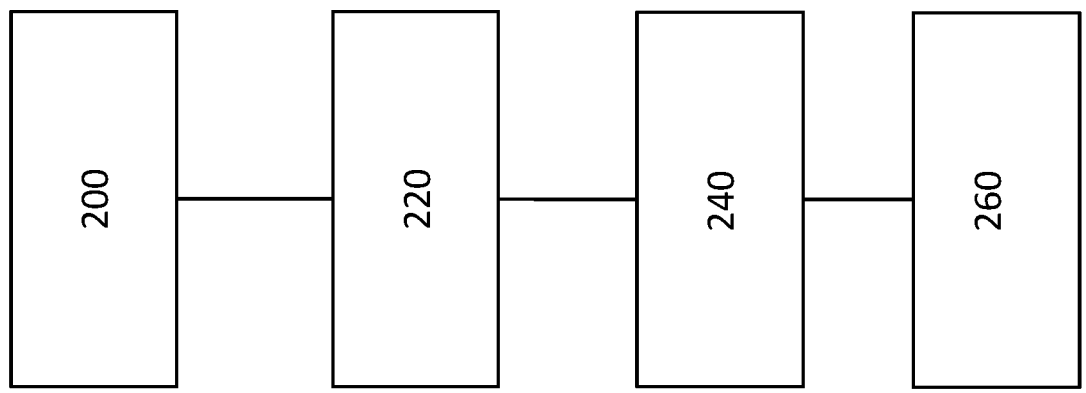
FIG. 2: A flow chart of the method.

In order to make driving at the speed v_0-1 more comfortable and safer and to reduce the aforesaid prestresses, the steering angle of the wheels on the respective axles is limited. To detect the speed at the time, the control unit SG determines the instantaneous speed v_mom of the vehicle continually, preferably at intervals of 10 ms. As an example, this is illustrated in FIG. 1 by a broken line between the control unit SG and the right-hand rear wheel 3. FIG. 2 shows how a method for operating an actuator of a steer-by-wire steering system of a motor vehicle can be carried out in order to determine an acceptable steering angle as the limited steering angle. The method comprises a step 200 of determining an instantaneous speed v_mom of the motor vehicle 1, which, as said earlier, serves for the determination of the speed v_mom at which driving is taking place. If the vehicle is driving at a speed of v_0-1, preferably such that v<v_0.1<0.7 km/h, then in a step 220 of determining a limited steering angle RLw_lim_mom the steering angle is limited at least as a function of the instantaneous speed v_mom. In the determination step further parameters can also be taken into account, for example the condition of the road, which can be determined from the surroundings of the vehicle by means of sensors s while driving. If, in a further step 240 of detection, a steering angle demand Lw_req is detected, which originates from the driver's wish or in the form of a control signal from the control unit SG, then the limited steering angle RLw_lim_mom stored in the control unit SG is decisive, so no greater steering angle can be set. For example, in the control unit SG a characteristic can be stored, such that with reference to it the limited steering angle can be called up as a function of various speed ranges. In a further step of activating the actuator, now a steering angle $RLw_v$, $RLw_h$ is set at the wheels 2, 3 of the axle 21 31 concerned as a function of the steering angle demand Lw_req, taking into account the previously determined limited steering angle RLw_lim_mom. If the vehicle remains in the speed range v_0-1, then the maximum possible steering angle is the previously determined limited steering angle RLw_lim_mom. During this speed v_0-1 the steering angle $RLw_v$, $RLw_h$ that can be set can have a value from 0° up to the determined limited steering angle RLw_lim_mom.

Above the said speed range v_0-1 the limited steering angle RLw_lim_mom is cancelled and the steering angle established by design or a possible steering angle limited because of the vehicle's situation can be set. For example, heavy loading of a vehicle can constitute such a vehicle situation, in which the wheels are covered deeply by the wheel arches and because of them the designed steering angle cannot be set because otherwise contact with the vehicle body or the chassis could take place.

Figure 3:
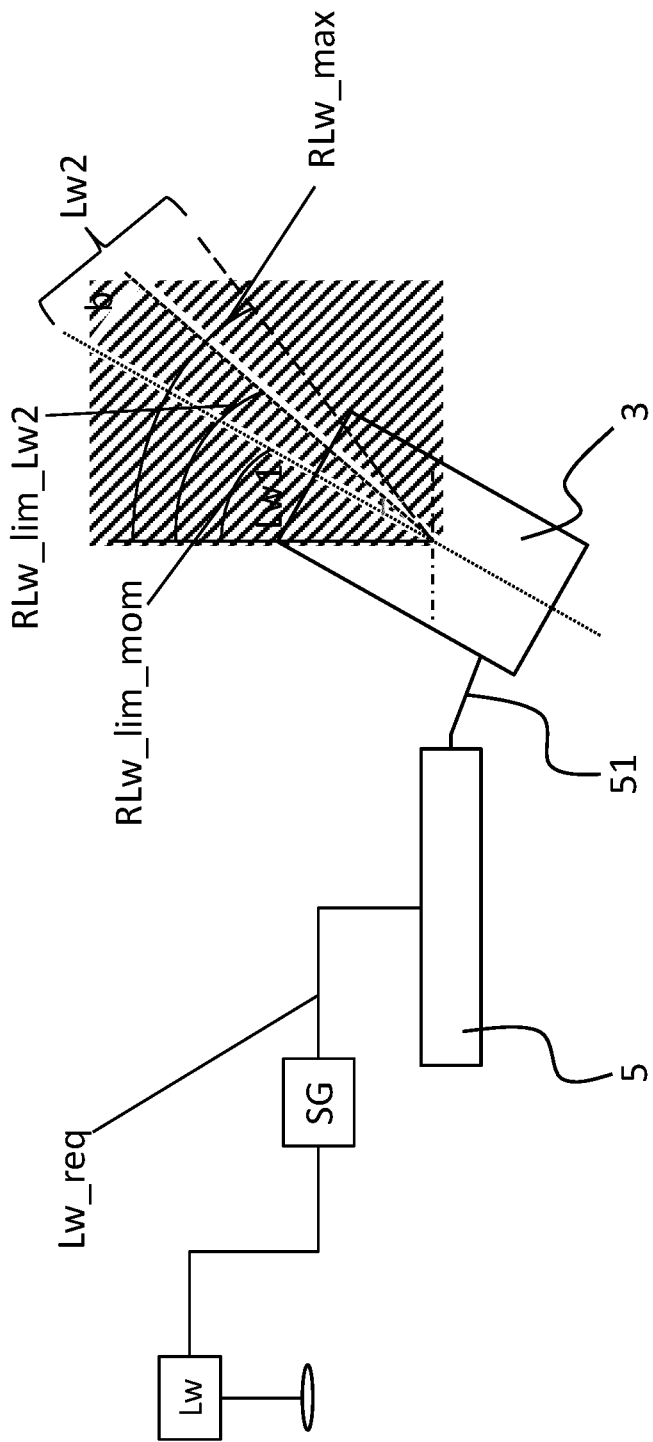
FIG. 3: A diagram illustrating an implementation of the method.

FIG. 3 shows a diagram that illustrates the previously described relationship in detail. The figure shows a section of a rear-axle steering system as in FIG. 1, in which a steer-by-wire steering system 5 is coupled to a wheel 3 by way of a steering linkage 51 in order to steer the wheel. The wheel 3 is steered to the right as far as a steering angle which, as the limited steering angle RLw_lim_mom, was determined as a function of the instantaneous speed v_mom, which is in the speed range v_0-1. By virtue of a new steering angle demand Lw_req, which has been called for in accordance with the driver's wish or the calculation by the control unit SG, it is now possible while the speed remains in the aforesaid speed range v_0-1 to set any steering angle in the range Lw1. The range Lw1 extends from driving straight ahead (central position 0°) as far as the limited steering angle RLw_lim_mom. Analogously, this also applies for a possible steering movement to the left (not considered here).

If the vehicle is driving at a speed above the said speed range (0.7<=v1), then any steering angle in the range Lw2, i.e., up to the maximum possible steering angle RLw_max can be set, provided that the vehicle's situation, for example the loading of the vehicle, allows it.

In a particular embodiment the vehicle can at first be moved at a higher speed (0.7<=v1), i.e., outside the speed range v_0-1, so that the previously stored limited steering angle RLw_lim_mom is cancelled. If now the vehicle slows down, i.e., reverting to the speed range v_0-1, then the highest most recently stored steering angle RLw_rec_Lw2, which can be between RLw_lim_mom and RLw_max, is established as the new limited steering angle RLw_lim_Lw2 and stored in the control unit. If now a steering angle demand Lw_req above the steering angle RLw_lim_mom is made, then any value in the range b between RL2_lim_mom and RLw_lim_Lw2 can be set. This is not problematic, because during the movement of the vehicle at (0.7<=v1) no relevant prestress has been built up in the tires, control arms, bearings or steering linkages.

If, for example, a motor vehicle is moving in the speed range v_0-1 during a parking process and owing to this very low speed a limited steering angle RLw_lim_mom of 7° has been stored, and if owing to the subsequent vehicle movement at v1>=0.7 km/h a larger steering angle of 8° is set, this value is stored in the control unit as RLw_rec_Lw2. After that, if the speed reverts to the speed range v_0-1 and therefore for RLw_lim_mom a limited steering angle of 7° is appropriate, then owing to a new steering angle demand a steering angle at most between RLw_lim_mom and RLw_lim_Lw2, that is to say a steering angle between 7° and at most 8° can be set.

The method steps according to the invention can be repeated and carried out in a sequence other than that described. Thus, the invention is not limited to the sequence mentioned herein.

INDEXES 1 (Motor) vehicle
2 Front wheel
3 Rear wheel
4 Steer-by-wire steering system
5 Steer-by-wire steering system
14 Steering-wheel
21 Front axle
31 Rear axle
41 Steering linkage
51 Steering linkage
200 Detection step
220 Determination step
240 Detection step
260 Activation step
ADAS Driver assistance system, autonomous driving
b Range
BUS Bus system
ESC Electronic stability control
Korr Corridor function
Lw Sensor unit
Lw_req Steering angle demand
Lw1 First steering angle range
Lw2 Second steering angle range
PAS Parking assistance system
$RLw_v$ Front (wheel) steering angle
$RLw_h$ Rear (wheel) steering angle
RLw_mom Limited steering angle
RLw_lim_Lw1 Limited steering angle
RLw_rec_Lw2 Limited steering angle
RLw_max Maximum possible steering angle
SG Control system, control unit
S Sensor system
T Trajectory
v_0-1 First speed range
v1 First speed
v_mom Instantaneous speed

The invention claimed is:

1. A method for operating an actuator of a steer-by-wire steering system of a motor vehicle at speeds from standstill to parking and/or maneuvering, the method comprising the following steps:
    detecting a current speed of the motor vehicle, the current speed in a range from standstill to a parking and/or maneuvering speed;
    determining a limited steering angle as a function of at least the current speed;
    detecting a steering angle request for recording a change in a steering angle as well as a rate of change of the steering angle; and
    controlling the actuator to set the steering angle of at least one wheel, at least as a function of the steering angle request and taking into account the limited steering angle so that loads within the actuator, due to a buildup of preload between a tire and a roadway and/or between the actuator and a steering linkage, are reduced.

2. The method according to claim 1, wherein determining the limited steering angle includes changing the limited steering angle to a value smaller than a predefined maximum steering angle.

3. The method according to claim 2, determining the limited steering angle includes setting the limited steering angle at 50 to 80% of the predefined maximum steering angle.

4. The method according to claim 1, wherein determining the limited steering angle includes setting a first steering angle range from 0° up to less than or equal to the limited steering angle (RLw_lim_mom) and setting a second steering angle range larger than the limited steering angle up to the predefined maximum steering angle, and wherein at a speed of the motor vehicle from standstill up to a first speed the steering angle can adopt any value in the first steering angle range.

5. A method for operating an actuator of a steer-by-wire steering system of a motor vehicle at speeds from standstill to parking and/or maneuvering, the method comprising the following steps:
    detecting a current speed of the motor vehicle, the current speed in a range from standstill to a parking and/or maneuvering speed;
    determining a limited steering angle as a function of at least the current speed;
    setting a first steering angle range from 0° up to less than or equal to the limited steering angle, wherein at a speed of the motor vehicle from standstill up to a first speed, the steering angle can adopt any value in the first steering angle range;
    setting a second steering angle range larger than the limited steering angle up to the predefined maximum steering angle;
    detecting a steering angle request for recording a change in a steering angle as well as a rate of change of the steering angle;
    controlling the actuator to set the steering angle of at least one wheel, at least as a function of the steering angle request and taking into account the limited steering angle so that loads within the actuator are reduced due to a buildup of preload between a tire and a roadway and/or between the actuator and a steering linkage;
    driving at a speed higher than the first speed;
    subsequently reverting to and remaining in the first speed range; and
    setting a most recently set steering angle from the second steering angle range as a new limited steering angle.

6. The method according to claim 5, comprising:
reverting to and remaining in the first speed range; and
receiving a new steering angle request, the new steering angle request being larger than 50% to 80% of the predefined maximum steering angle, wherein the new limited steering angle is in a range of 50% to 80% of the predefined maximum steering angle and not greater than the retained limited steering angle.

7. The method according to claim 4, comprising:
cancelling the limited steering angle at a speed higher than the first speed; and
setting the steering angle, after detecting the steering angle request, in the step of controlling the actuator to a value up to the predefined maximum steering angle.

8. The method according to claim 1, comprising:
setting a new steering angle starting from a previously set steering angle as a function of the current speed, wherein the steering angle request takes place according to a characteristic curve in order to prevent an abrupt steering angle change.

9. The method according to claim 1, comprising:
changing an acceleration of a drive unit of the actuator, as a function of the current speed, in the step of determining the limited steering angle.

10. A steer-by-wire steering system having an actuator, wherein the steer-by-wire steering system is operated in accordance with the method of claim 1.

11. A control unit for controlling an actuator of a steer-by-wire steering system of a motor vehicle, comprising:
an interface configured to detect a speed that represents a current speed of the motor vehicle in a range from standstill to a parking and/or maneuvering speed;
a further interface configured to detect a steering angle request for recording a change in a steering angle and a rate of change in the steering angle, the steering angle demand which represents an instantaneous steering angle change due to a driver's request or due to a further change of a steering angle determined by a control unit;
a unit configured to determine a limited steering angle, which represents an instantaneous maximum possible steering angle; and
a unit configured to control an actuator in order to set a steering angle of at least one wheel as a function of at least of the steering angle request and having regard to the limited steering angle, so that loads within the actuator, due to a buildup of preload between a tire and a roadway and/or between the actuator and a steering linkage, are reduced.

12. A computer program product, having executable code that when executed by a processor of a steer-by-wire steering system operates the actuator according to the method of claim 1.

13. The method according to claim 4, wherein the first speed is from 0.5 to 1 km/h.

14. The method according to claim 4, wherein the first speed is not greater than 0.7 km/h.

15. The method according to claim 5, wherein the first speed is from 0.5 to 1 km/h.

16. The method according to claim 5, wherein the first speed is not greater than 0.7 km/h.

* * * * *